(12) United States Patent
Baer et al.

(10) Patent No.: US 9,425,969 B2
(45) Date of Patent: Aug. 23, 2016

(54) CHARGING DECISIONS IN AN IP MULTIMEDIA SUBSYSTEM

(75) Inventors: Anders Baer, Årsta (SE); Jan Dahl, Älvsjö (SE); Magnus Harnesk, Täby (SE); David Khan, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 14/367,535

(22) PCT Filed: Dec. 23, 2011

(86) PCT No.: PCT/EP2011/074000
§ 371 (c)(1),
(2), (4) Date: Jun. 20, 2014

(87) PCT Pub. No.: WO2013/091731
PCT Pub. Date: Jun. 27, 2013

(65) Prior Publication Data
US 2015/0222442 A1    Aug. 6, 2015

(51) Int. Cl.
*H04L 12/14* (2006.01)
*H04M 15/00* (2006.01)
(Continued)

(52) U.S. Cl.
CPC .......... *H04L 12/1407* (2013.01); *H04L 12/141* (2013.01); *H04L 12/1403* (2013.01); *H04L 12/1425* (2013.01); *H04L 12/1457* (2013.01);
(Continued)

(58) Field of Classification Search
CPC ............ H04L 12/1403; H04L 12/1407; H04L 12/141; H04L 12/1457; H04L 12/1467; H04L 65/1016; H04M 15/41; H04M 15/57; H04M 15/65; H04W 8/04
USPC ......................................................... 370/259
See application file for complete search history.

(56) References Cited

U.S. PATENT DOCUMENTS

| 8,543,088 B2 * | 9/2013 | Narayan ................. H04L 12/14 |
| | | 379/114.01 |
| 8,660,521 B1 * | 2/2014 | Daniel ................... H04M 15/68 |
| | | 379/114.15 |

(Continued)

FOREIGN PATENT DOCUMENTS

WO    2007120598 A2    10/2007

OTHER PUBLICATIONS

3GPP, "3GPP TS 23.228 V12.4.0 (Mar. 2014)", 3rd Generation Partnership Project; Technical Specification Group Services and System Aspects; IP Multimedia Subsystem (IMS); Stage 2 (Release 12). Mar. 2014. pp. 1-307.

(Continued)

*Primary Examiner* — Chi H Pham
*Assistant Examiner* — Robert Lopata
(74) *Attorney, Agent, or Firm* — Murphy, Bilak & Homiller, PLLC (57) ABSTRACT

Apparatus for use within an IP Multimedia Subsystem network and comprising a receiver for receiving for a given user a charging type defining whether the user is a pre-paid user and or a post-paid user. The apparatus further comprises a Charging Triggering Function, CTF, entity for sending accounting information messages relating to said user to an Online Charging Function over an Ro interface or to a Charging Data Function over an Rf interface, and for including with the accounting information messages said charging type.

12 Claims, 7 Drawing Sheets

(51) Int. Cl.
  *H04L 29/06* (2006.01)
  *H04W 8/04* (2009.01)
(52) U.S. Cl.
  CPC ........ *H04L 12/1467* (2013.01); *H04L 65/1016* (2013.01); *H04M 15/41* (2013.01); *H04M 15/57* (2013.01); *H04M 15/64* (2013.01); *H04M 15/65* (2013.01); *H04W 8/04* (2013.01)

(56) References Cited

U.S. PATENT DOCUMENTS

| | | | |
|---|---|---|---|
| 2007/0036312 A1* | 2/2007 | Cai ...................... | H04M 15/00 379/126 |
| 2007/0173226 A1* | 7/2007 | Cai ........................ | H04L 12/14 455/405 |
| 2007/0297583 A1* | 12/2007 | Shan .................... | H04M 15/00 379/114.03 |
| 2008/0243655 A1* | 10/2008 | Cai ..................... | G06Q 30/0283 705/34 |
| 2010/0095010 A1* | 4/2010 | Dahl ...................... | H04L 12/14 709/228 |
| 2010/0248685 A1* | 9/2010 | Li ...................... | H04L 12/1403 455/406 |
| 2011/0040663 A1* | 2/2011 | Cai ........................ | H04L 12/14 705/30 |
| 2011/0078061 A1* | 3/2011 | Cai ........................ | H04L 12/14 705/30 |
| 2012/0102211 A1* | 4/2012 | Dahl ...................... | H04L 12/14 709/228 |
| 2012/0123914 A1* | 5/2012 | Sharma ................ | H04M 15/00 705/30 |
| 2012/0224524 A1* | 9/2012 | Marsico ............ | H04L 12/1407 370/315 |
| 2012/0225679 A1* | 9/2012 | McCann ................ | H04L 45/64 455/466 |
| 2012/0233323 A1* | 9/2012 | Conte .................... | H04L 12/14 709/224 |
| 2012/0243432 A1* | 9/2012 | Liebsch ............. | H04L 12/1403 370/252 |
| 2012/0290452 A1* | 11/2012 | Pancorbo Marcos ............... | H04L 12/1407 705/30 |
| 2012/0295585 A1* | 11/2012 | Khan ...................... | H04L 12/14 455/406 |
| 2013/0054428 A1* | 2/2013 | Shaikh .................. | G06Q 30/04 705/30 |
| 2013/0058260 A1* | 3/2013 | Dahl ................... | H04L 12/1403 370/259 |

OTHER PUBLICATIONS

3GPP, "3GPP TS 24.229 V12.4.0 (Mar. 2014)", 3rd Generation Partnership Project; Technical Specification Group Core Network and Terminals; IP multimedia call control protocol based on Session Initiation Protocol (SIP) and Session Description Protocol (SDP); Stage 3 (Release 12). Mar. 2014. pp. 1-825.

3GPP, "3GPP TS 29.229 V12.1.0 (Dec. 2013)", 3rd Generation Partnership Project; Technical Specification Group Core Network and Terminals; Cx and Dx interfaces based on the Diameter protocol; Protocol details (Release 12). Dec. 2013. pp. 1-37.

3GPP, "3GPP TS 32.260 V12.3.0 (Mar. 2014)", 3rd Generation Partnership Project; Technical Specification Group Services and System Aspects; Telecommunication management; Charging management; IP Multimedia Subsystem (IMS) charging (Release 12). Mar. 2014. pp. 1-173.

3GPP, "3GPP TS 32.299 V12.4.0 (Mar. 2014)", 3rd Generation Partnership Project; Technical Specification Group Services and System Aspects; Telecommunication management; Charging management; Diameter charging applications (Release 12) Mar. 2014. pp. 1-157.

Hakala, H. et al., "Diameter Credit-Control Application", Internet Engineering Task Force, Network Working Group, RFC 4006, Standards Track, Aug. 2005, pp. 1-102.

Ozianyi, V. G., "Design and Implementation of Scalable IMS", The 5th IEEE International Workshop on Performance and Management of Wireless and Mobile Networks (P2MNET 2009); Oct. 20-23, 2009. pp. 800-806. Zurich, Switzerland.

Rosenberg, J., et al., "SIP: Session Initiation Protocol", Internet Engineering Task Force Request for Comments 3261. The Internet Society. Jun. 2002. 1-244.

* cited by examiner

CHARGING DECISIONS IN AN IP MULTIMEDIA SUBSYSTEM

TECHNICAL FIELD

The present invention relates to charging decisions in an IP Multimedia Subsystem and in particular to such decisions made in respect of how subscribers will be charged for making use of IP Multimedia Subsystem services.

BACKGROUND

IP Multimedia (IPMM) services provide a combination of voice, video, messaging, data, etc, within the same session. As the number of basic applications and the media which it is possible to combine increases, the number of services offered to the end users will grow, and the potential for enriching inter-personal communication experience will be improved. This leads to a new generation of personalised, rich multimedia communication services, including so-called "combinational IP Multimedia" services.

IMS is the technology defined by the Third Generation Partnership Project (3GPP) to provide IP Multimedia services over mobile communication networks. IMS provides features to enhance the end-user person-to-person communication experience through the integration and interaction of services. IMS allows enhanced person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP) carried by SIP signalling is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Within an IMS network, Call Session Control Functions (CSCFs) perform processing and routing of signalling. CSCFs handle session establishment, modification and release of IP multimedia sessions using the SIP/SDP protocol suite. 3GPP TS23.228 describes the logical nodes P-CSCF, I-CSCF, S-CSCF, E-CSCF and BGCF. The S-CSCF conforms to 3GPP TS 24.229 and performs session control services for User Equipments (UEs). It maintains the session state to support the services, and performs the following functions:
it acts as a registrar according to [RFC3261] at registration;
it notifies subscribers about registration changes;
it provides session control for the registered users' sessions;
it handles SIP requests, and either services these internally or forwards them on to a further node; and
it interacts with IMS Application Servers.

The S-CSCF performs SIP routing according to 3GPP routing procedures.

The S-CSCF may further act as a Charging Triggering Function (CTF), according to the principles outlined in the corresponding technical specifications, [TS 32.260] and [TS 32.299] and therefore supports charging for users making use of IMS infrastructure and services. Fulfilling the role of CTF in an IMS network requires a number of actions in the S-CSCF in order to identify the corresponding signalling event triggered by a UE activity. The S-CSCF, when performing the normal routing actions for the SIP signalling events it is handling, determines whether the SIP information represents a chargeable activity and, if so, which type of charging mechanism to apply. In a modification to this architecture, the CTF may implemented in an Application Server with which the S-CSCF communicates over the ISC interface.

The IMS architecture provides for two distinct charging models: offline charging, and online charging. Both online and offline charging involve the sending of accounting information to some centralised charging node for collection and processing.

In order to implement a pre-paid subscription model, online charging is required. Typically, a subscriber purchases a number of credits from an operator. If a SIP session is initiated by a SIP request sent from the subscriber's UE to the S-CSCF, the S-CSCF either makes use of an internal CTF module or contacts an Application Server implementing a CTF. The CTF node detects whether the requested session is subject to a charge or not. If the requested session is subject to a charge, the CTF node contacts an Online Charging Function (OCF) implemented within an Online Charging System (OCS) node in which the subscriber's current credit is stored. If the subscriber's account holds sufficient credit for the SIP request to be granted, the OCF replies accordingly to the CTF, which grants the request. Similarly, if insufficient credit is available, the SIP request may be turned down, or the session may be granted subject to a limited duration.

The CTF (either as a standalone node or as an internal module within the S-CSCF) and OCF implement the online charging functionalities for the IMS architecture. Communication between the CTF and OCF nodes takes place over the Ro interface described in 3GPP TS32.299, and is governed by the DIAMETER protocol. Specifically, the CTF sends DIAMETER Credit Control Request (CCR) messages, while the OCS replies in DIAMETER Credit Control Answer (CCA) messages. These messages are specified in RFC 4006. The OCF uses the accounting information received over the Ro interface to generate Call Data Records (CDRs) and sends these onwards to a centralised billing system.

Figure 1:
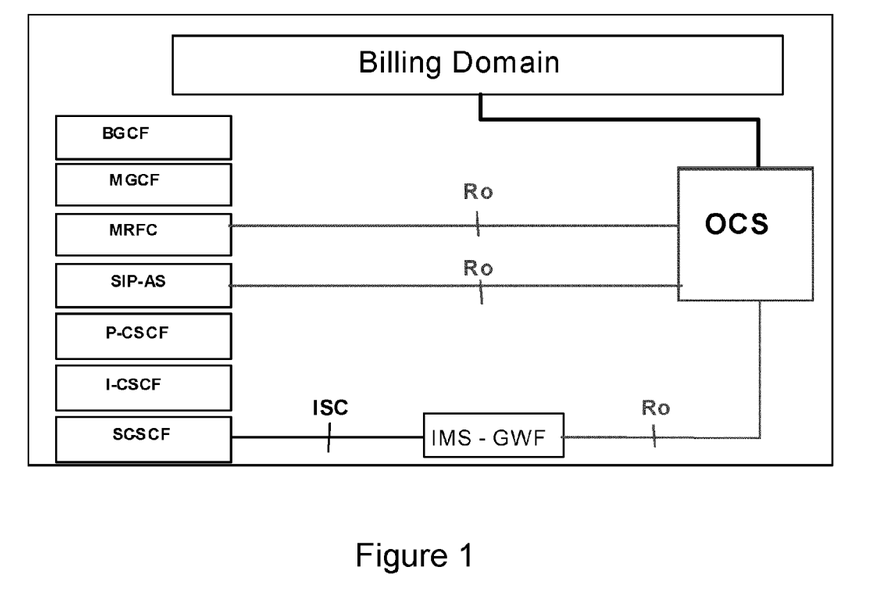
FIG. 1 illustrates schematically an IMS online charging architecture.

FIG. 1 illustrates the online charging architecture for an IMS network in the case where the CTF is implemented within a standalone node (AS). As illustrated in the Figure, other nodes within the IMS network may also communicate with the OCF over the Ro interface.

Figure 2:
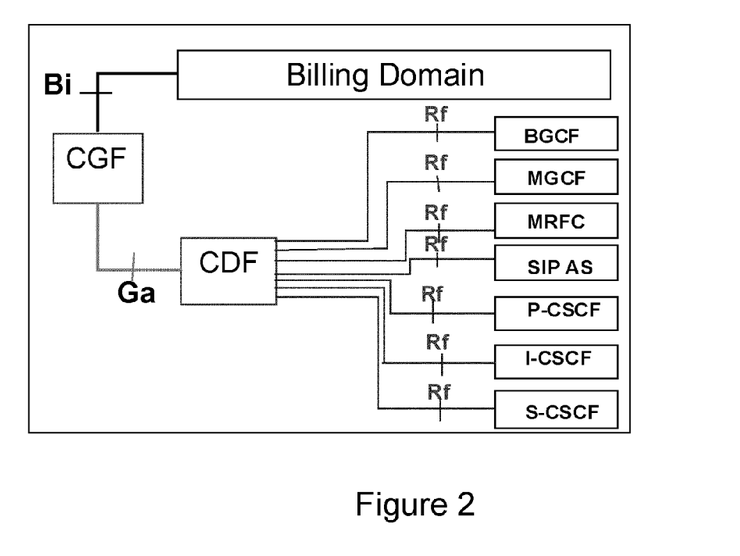
FIG. 2 illustrates schematically an IMS offline charging architecture.

In the case of offline charging within an IMS network, SIP network entities including the S-CSCF that are involved in a session use the Diameter Rf interface to send accounting information, generated by associated CTFs, to a Charging Data Function (CDF). The CDF uses the received accounting information to generate CDRs, and sends these to a Charging Gateway Function (CGF) over the GTP-based Ga interface. The CGF acts as a gateway between the IMS network and the billing domain, communicating with the billing domain over the Bi interface. This offline charging architecture is illustrated in FIG. 2.

Figure 3:
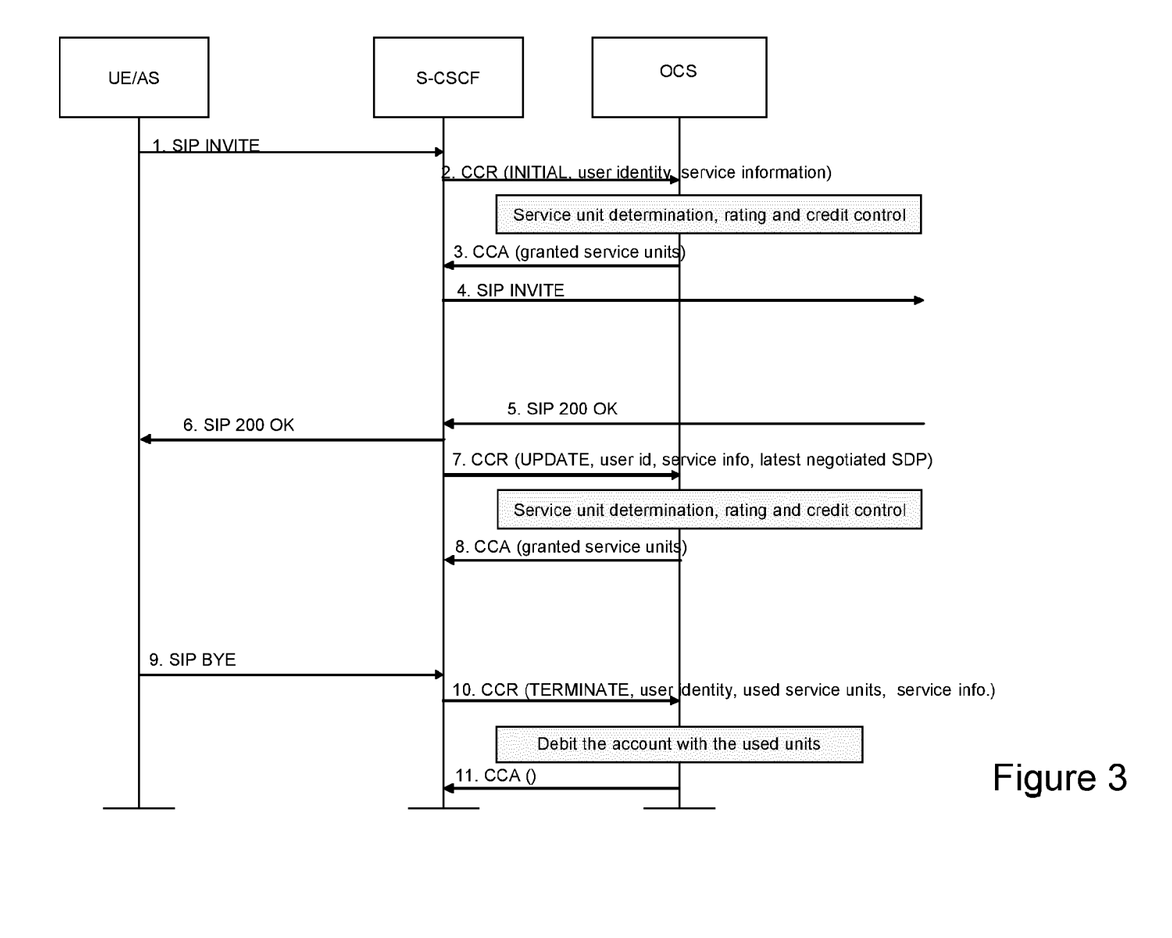
FIG. 3 is a partial signalling flow for a call set up procedure in the online charging architecture of FIG. 1.
Figure 4:
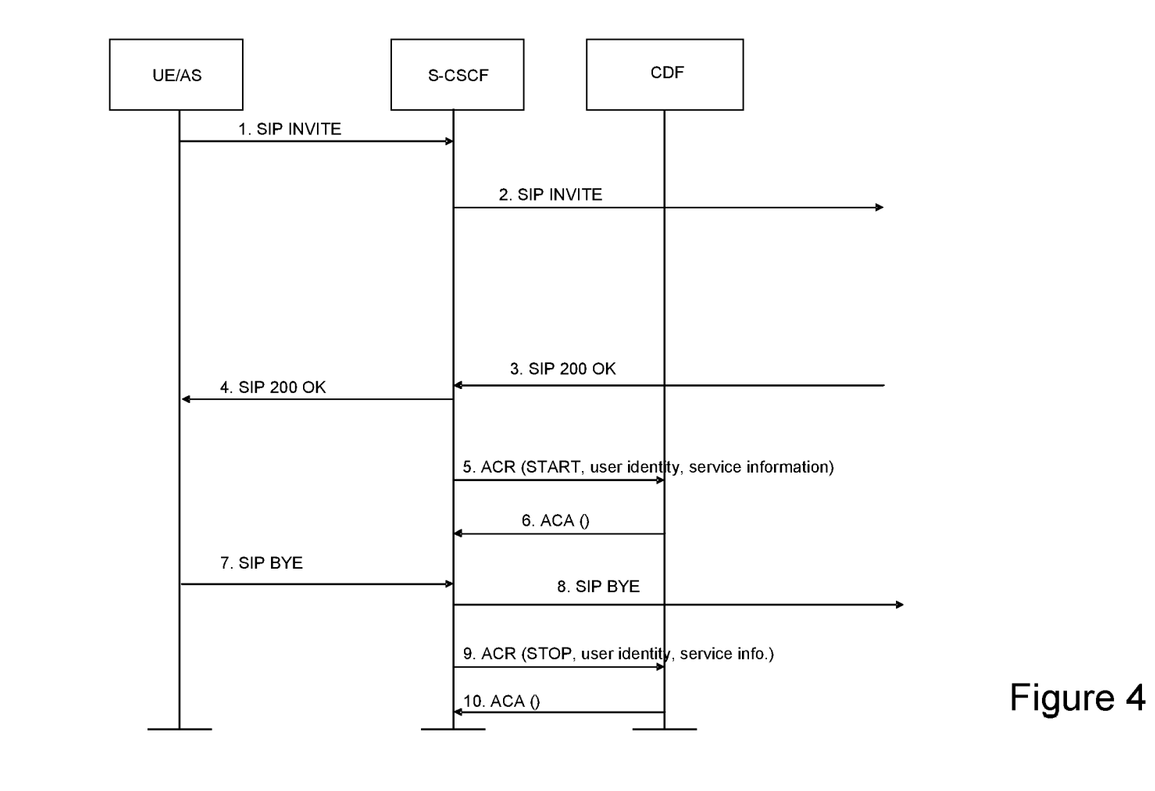
FIG. 4 is a partial signalling flow for a call set up procedure in the offline charging architecture of FIG. 2.

FIGS. 3 and 4 illustrate respectively signalling flows for the online and offline charging architectures, where in both cases the charging activity is associated with a call request initiated by a User Equipment (UE) sending a SIP INVITE to the IMS network. It will be appreciated that not all nodes involved in the process are shown. In the case of the online charging mechanism, the S-CSCF exchanges Credit Control Requests (CCRs) and Credit Control Answers (CCAs) with the OCF over the Ro interface, whilst in the case of the offline charging mechanism, the S-CSCF exchanges Accounting Requests (ACRs) and Accounting Answers (ACAs) with the CDF.

Many developing countries deploying IMS architectures rely exclusively on an online charging infrastructure, primarily because the technical infrastructure for setting up an online charging system for an IMS architecture is not as complex and costly as the technical infrastructure needed for setting up an offline charging system. Nonetheless, even operators of online only charging network architectures may want to handle post-paid as well as pre-paid subscribers. In some cases, operators of an offline only charging network may want to handle pre-paid as well as post-paid subscribers.

SUMMARY

According to a first aspect of the present invention there is provided apparatus for use within an IP Multimedia Subsystem network and comprising a receiver for receiving for a given user a charging type defining whether the user is a pre-paid user and or a post-paid user. The apparatus further comprises a Charging Triggering Function, CTF, entity for sending accounting information messages relating to said user to an Online Charging Function over an Ro interface or to a Charging Data Function over an Rf interface, and for including with the accounting information messages said charging type.

At least certain embodiments of the invention can improve the flexibility with which charging can be applied in a given operator's network. For example, an operator implementing only an online, Ro, interface, may be able to employ both pre-paid and post-paid charging in its network.

The receiver within the apparatus may be configured to receive said charging type at IMS registration of the user or at another user profile retrieval point.

The charging type may define the user as one of a pre-paid user, a post-paid user, or another category of user.

According to a second aspect of the present invention there is provided apparatus for use within an IP Multimedia Subsystem network and comprising an online charging function entity for generating Call Data Records and for sending these to a domain billing system. The apparatus further comprises an Ro interface for receiving from a Charging Triggering Function, CTF, accounting information messages containing a charging type defining whether the user is a pre-paid user and or a post-paid user, wherein the online charging function entity is configured to perform billing based upon the charging type contained within a received accounting message.

According to a third aspect of the present invention there is provided apparatus for use within an IP Multimedia Subsystem network and comprising a charging data function entity for generating Call Data Records and for sending these to a domain billing system. The apparatus further comprises an Rf interface for receiving from a Charging Triggering Function, CTF, accounting information messages containing a charging type defining whether the user is a pre-paid user and or a post-paid user, wherein the charging data function entity is configured to perform billing based upon the charging type contained within a received accounting message.

According to a fourth aspect of the present invention there is provided apparatus for use within an IP Multimedia Subsystem network and comprising a charging profile database configured to contain one or more addresses for online charging systems within the IP Multimedia Subsystem network. The apparatus further comprises a user profile database configured to contain, for each of a set of users, user profile data including a pointer to an online charging address, and a charging type defining whether the user is a pre-paid user, a post-paid user, and or another category of user, and a user profile data response entity for sending to a requesting entity within the IMS network, over a Cx or Sh interface, the user profile data including said charging type.

This apparatus may be configured to operate as a Home Subscriber Server.

According to a fifth aspect of the present invention there is provided a method of handling charging for a user within an IP Multimedia Subsystem network. The method comprises maintaining within a Home subscriber Server, HSS, profile data for each of a set of IMS users, the profile data including for the associated user a charging type defining whether the user is a pre-paid user, a post-paid user, and or another category of user and, for a given user, sending the profile data from the HSS to a Charging Triggering Function, CTF. The method further comprises, at the CTF, including the charging type in accounting messages associated with the user sent to an online charging function over the Ro interface or to a charging data function over the Rf interface, and, at the online charging function or charging data function, handling charging for the user in dependence upon the charging type.

DETAILED DESCRIPTION

Within an IP Multimedia Subsystem (IMS) network of a wireless network operator's domain, subscriber data for IMS subscribers is provisioned in the Home Subscriber Server (HSS). In particular, for each subscriber, the provisioned data includes a "pointer" or identity of a charging address profile maintained within the HSS. A charging address profile will include one or both of an Event Charging Function (ECF) parameter which is the address of the relevant OCS within the operator's domain and a CDF address (e.g. FQDN) for the relevant CDF within the operator's domain (possibly primary and secondary addresses for both ECF and CDF). Normally, post-paid subscribers are associated with offline charging and pre-paid subscribers with online charging, but online charging can also be used for post-paid subscribers, for example to achieve spending control.

For operators that only have charging systems supporting online charging (i.e. where the network infrastructure provides an OCF accessed by the IMS over the Ro interface but not a CDF accessed over the Rf interface), it might be desirable to facilitate both pre-paid and post-paid services using online charging handled over the Ro-interface. However, in current deployments, this is problematic as there is no indication in the IMS user profile as to whether the subscriber is a pre-paid or a post-paid subscriber. Rather, if the subscriber's profile points to a charging address profile containing an ECF address, the subscriber is assumed to be a pre-paid subscriber and if his or her profile points to a charging profile containing a CDF address, the subscriber is assumed to be a post-paid subscriber.

To address this deficiency, it is proposed here to include within a subscriber's profile, as stored in the HSS, the logical meaning of the subscriber's charging type (pre-paid, post-paid) in addition to a pointer to the (online) charging address profile. When a user registers with the IMS, the user's profile data including the charging type will be downloaded from the HSS into the Serving Call Session Control Function (S-CSCF). At a charging event, the Charging Triggering Function (CTF), implemented within the S-CSCF or as a standalone Application Server coupled to the S-CSCF over the ISC interface, is able to send the charging type in a Credit Control Request (CCR) message sent to the OCF/OCS over the Ro interface. [NB. Use of the Rf interface for this purpose is discussed below.] Of course, the subscriber profile data may be downloaded to the S-CSCF at events other than IMS registration, e.g. a terminating call for an unregistered subscriber. Furthermore, the profile data may be obtained by nodes other than the S-CSCF, e.g. other CSCF, AS, or MRFC.

A node possessing the new subscriber charging type may be able to make decisions for a subscriber based upon the charging type. These decisions may relate, for example, to actions such as terminate (e.g. the Credit Control Request is regarded as failed and the SIP dialog or transaction is terminated), continue (e.g. the S-CSCF sees the service as granted and will continue without further request), retry and terminate or store for later processing etc, for the specific subscriber charging session.

Figure 5:
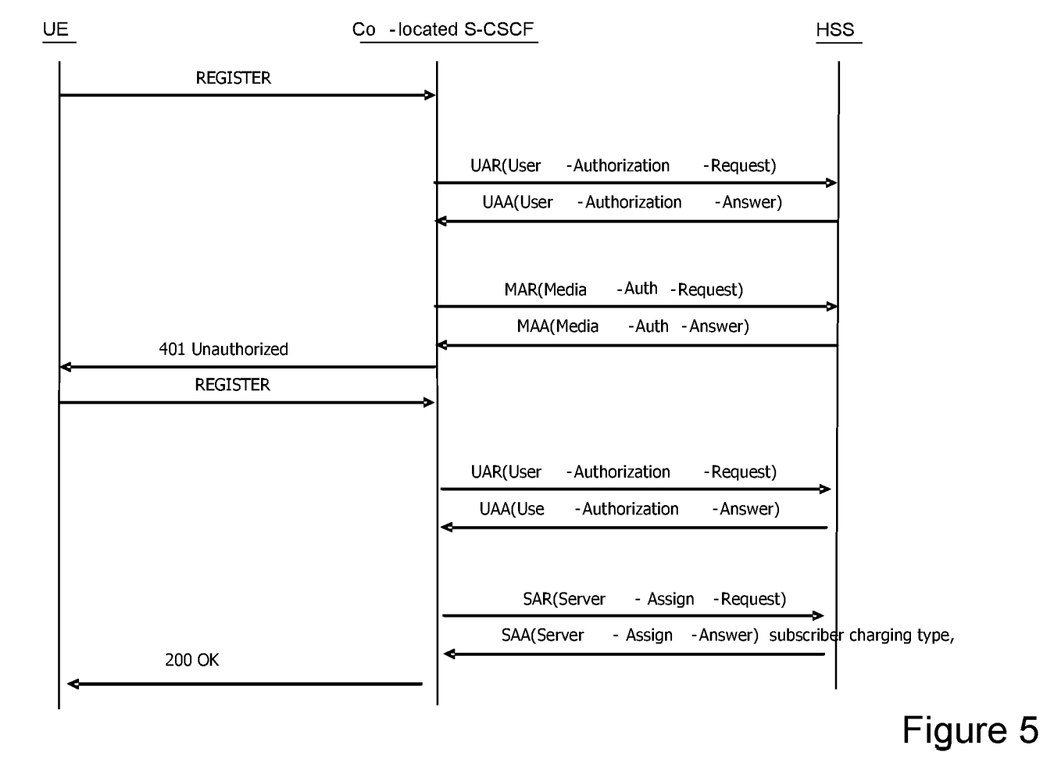
FIG. 5 is a signalling flow for a user IMS registration process and which allows the HSS to provision to the CTF (co-located with an S-CSCF) a subscriber charging type.

Considering the proposal in more detail, the user profile for a subscriber stored in the HSS is extended with a subscriber charging type that defines whether the user is a pre-paid or post-paid subscriber. The charging type may further define, as a third type, a subscriber for which no charging is applied. The user profile is downloaded to the S-CSCF over the Cx interface during IMS registration of the user, or can be fetched via the Sh interface. This procedure is illustrated in FIG. 5, for the case where the CTF is co-located with the S-CSCF. The subscriber charging type can be carried in the XML part of the user profile (Sh case) or as separate new Attribute Value Pair (AVP) (Cx case). The S-CSCF may also include the subscriber charging type in messages (e.g. a SIP INVITE) sent over the ISC interface in order to inform other nodes of the charging type.

Considering the XML part (Sh case), the Charging-Information is of type Grouped, and contains the addresses of the charging functions. This group is extended with the new user profile data described above, i.e.:

Charging-Information::=<AVP Header: 618 10415>
 [Primary-Event-Charging-Function-Name]
 [Secondary-Event-Charging-Function-Name]
 [Primary-Charging-Collection-Function-Name]
 [Secondary-Charging-Collection-Function-Name]
 [Subscriber-Charging-Type]
 *[AVP]

An operator may choose to include only a (primary and secondary) ECF name in the XML part, or only a (primary and secondary) CCF name, or both.

The Subscriber-Charging-Type AVP is of type Enumerated. This AVP contains the type of user charging category, for example:

POST_PAID (0)
 This value is used to indicate that the user should be treated as a post-paid user only.
PRE_PAID (1)
 This value is used to indicate that the user should be treated as a pre-paid user only.
POST_PAID-PRE_PAID (2)
 This value is used to indicate that the user should be treated as both post-paid and pre-paid. [In practice, it might be included to allow the charging system to decide on post-paid or pre-paid charging.]
NO_CHARGING (3)
 This value is used to indicate that the user should have no charging.

Figure 6:
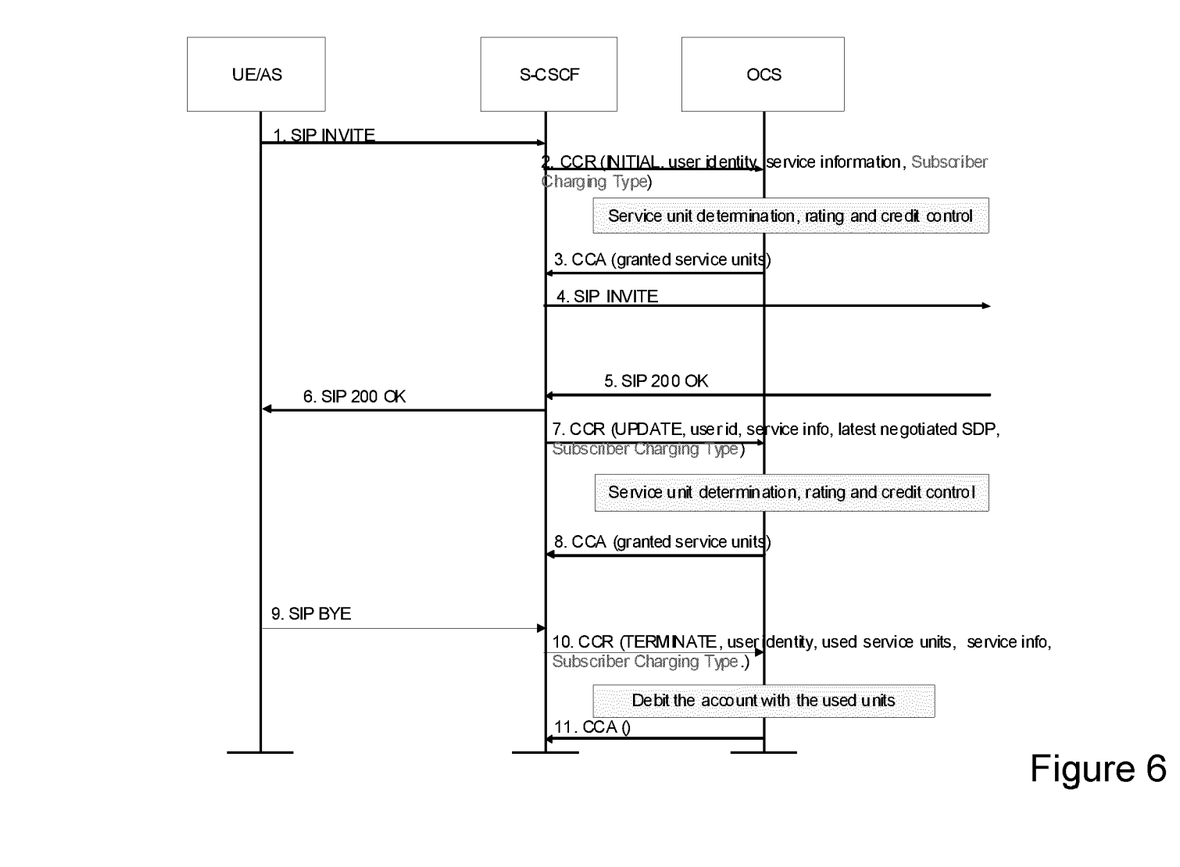
FIG. 6 is a partial signalling flow for a call set up procedure in the online charging architecture and according to which a CTF (in S-CSCF) sends a subscriber charging type to an OCS over the Rf interface.

Considering now the Ro interface (FIG. 1), the Subscriber-Charging-Type AVP will be included in the CCR(s) sent to the OCF/OCS, as illustrated in FIG. 6. The OCS is provided with logic to interpret the Subscriber-Charging-Type AVP, and to act accordingly.

It will be readily appreciated that, by using this approach, it will be possible to treat users in a more flexible manner and as a result satisfy the demands of operators who have only implemented limited charging functionality in their networks.

Figure 7:
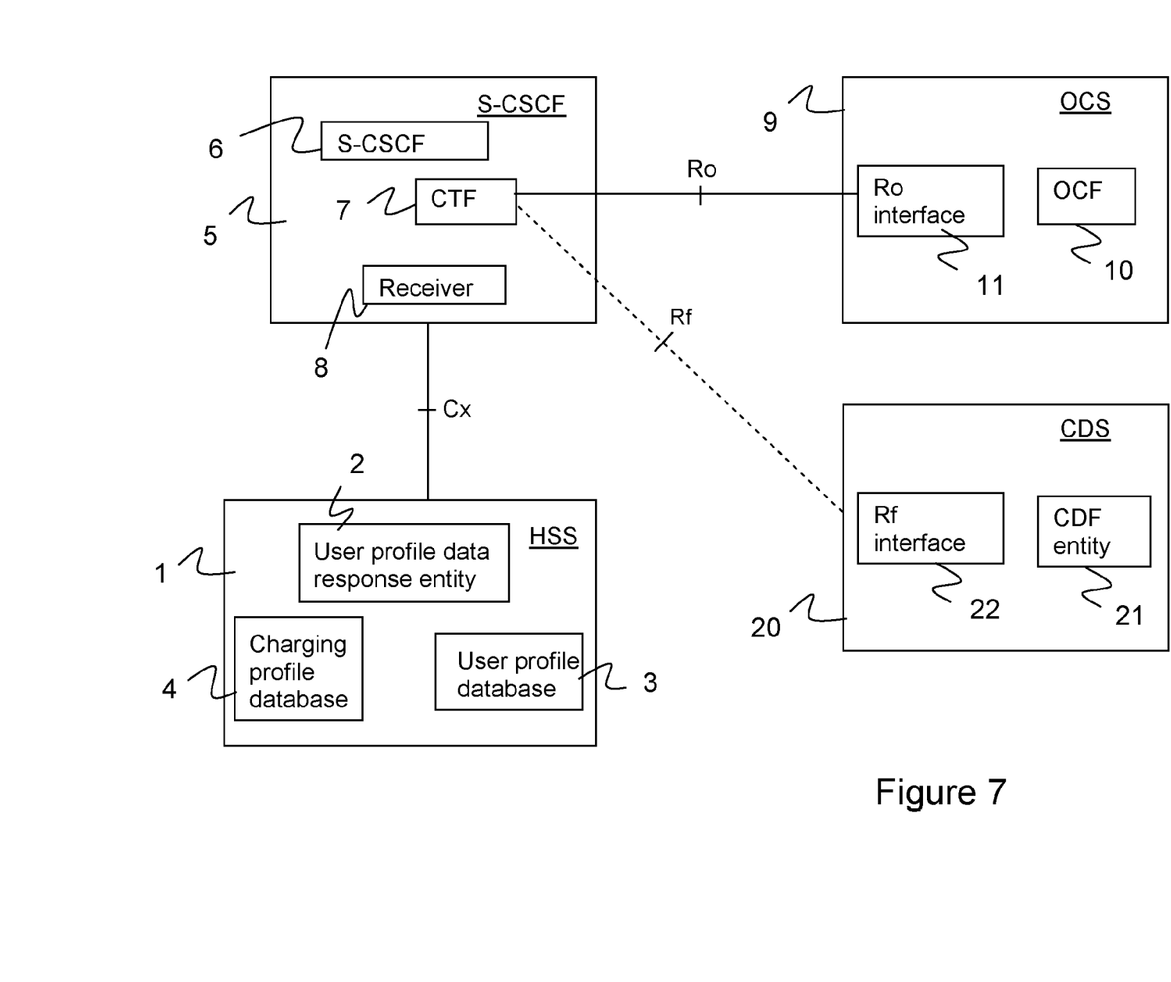
FIG. 7 illustrates schematically an IMS charging architecture comprising an OCS and, additionally or alternatively, a CDS.

FIG. 7 illustrates schematically various nodes within an IMS network architecture configured to implement the processes described above. In particular it illustrates an HSS 1 comprising a User profile data response entity 2 which is configured to respond to user profile data requests received from an S-CSCF, e.g. at user IMS registration, by returning that user profile data. The user profile data is maintained in the HSS within a user profile database 3. The HSS further comprises a charging profile database 4 (memory) which retains addresses pointing to available online and offline charging systems (OCS and CDF). The S-CSCF node 5 comprises the S-CSCF 6 itself, a co-located CTF 7, and a receiver 8 coupled to the Cx interface for receiving user profile data from the HSS.

For the case of online charging only, the architecture comprises an OCS node 9 comprising the OCF 10 and an Ro interface entity 11. This entity receives a charging type from the S-CSCF in respect of a user to be charged (for an IMS service).

Figure 8:
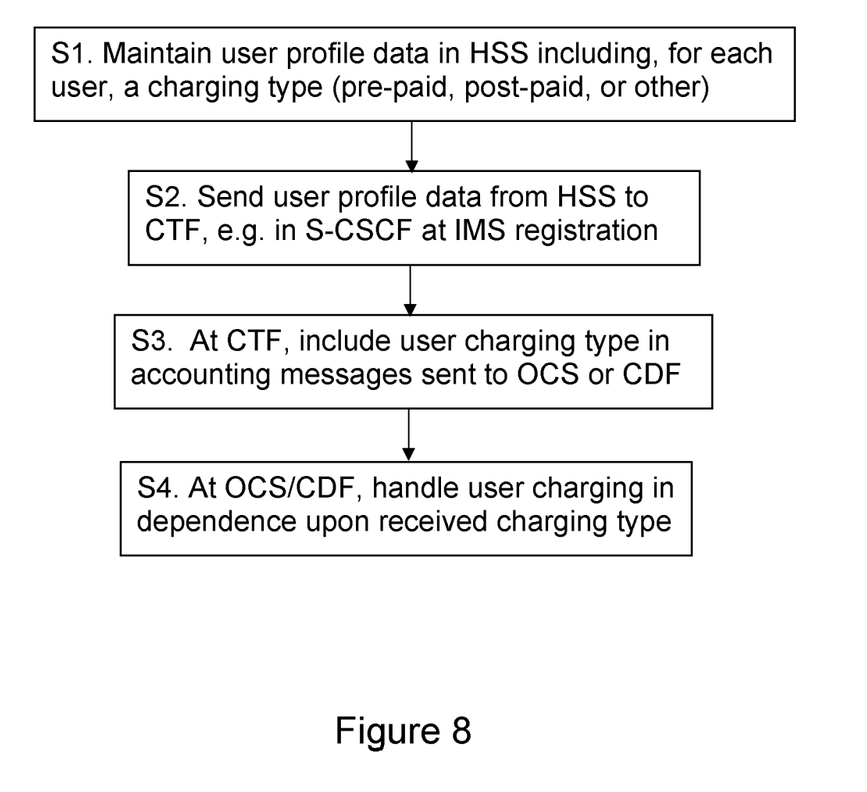
FIG. 8 is a flow diagram illustrating a method of handling charging with an IMS charging architecture.

FIG. 8 is a flow diagram identifying a number of key steps in the process. Step S1 comprises maintaining within a Home subscriber Server, HSS, profile data for each of a set of IMS users, the profile data including for the associated user a charging type defining whether the user is a pre-paid user, post-paid user, or another category of user. At step S2, for a given user, profile data is sent from the HSS to a Charging Triggering Function, CTF. Then, at step S3, the charging type is included in accounting messages associated with the user sent from the CTF to an online charging function over the Ro interface or to a charging data function over the Rf interface. At step S4, at the online charging function or charging data function, charging for the user is handled in dependence upon the charging type.

By way of background, the reader is referred to the following documents: IETF RFC4006; 3GPP TS 32.260; 3GPP TS 32.299; and 3GPP TS 29.229.

It will be appreciated by the person skilled in the art that various modifications may be made to the above described embodiments without departing from the scope of the present invention. For example, in the case of networks implementing only an Rf interface, i.e. an offline charging interface, or in cases where both an Rf and an Ro interface are provided but where the network prefers to use the Rf interface, a charging type (post-paid, pre-paid or other) may be included in Accounting Request (ACR) messages sent by the CTF to the CDF over the Rf interface. This allows charging for pre-paid subscribers to be handled using the offline charging mechanisms. Whilst not providing for exact real-time charging, only near real-time charging, it may be sufficient for some purposes. FIG. 7 illustrates a CDS 20 associated with this alternative approach and which comprises a CDF entity 21 and an Rf interface entity 22 for receiving a charging type from the S-CSCF in respect of a user to be charged (for an IMS service).

The invention claimed is:

1. An apparatus configured as a Call Session Control Function (CSCF) for operation in an Internet Protocol Multimedia Subsystem (IMS) network and comprising:
processing circuitry configured to:
determine from first information stored in a subscriber profile associated with a subscriber that the subscriber is of a first charging type;
determine from second information stored in the subscriber profile that charging messages for the subscriber should be sent over a charging interface associated with a second charging type that is different than the first charging type; and
send a charging message for the subscriber over the charging interface associated with the second charging type, wherein the charging message includes an indication of the first charging type of the subscriber, thereby enabling the charging system to differentiate the charging type of the subscriber as being different than the second charging type associated with the charging interface over which the charging message is sent; and
interface circuitry that is operatively associated with the processing circuitry and configured to support messaging by the processing circuitry via the charging interface associated with the second charging type;
wherein the first charging type is one of online charging and offline charging, and the second charging type is the other one of online charging and offline charging.

2. The apparatus of claim 1, wherein the first charging type is offline charging, the second charging type is online charging, the charging interface is a Ro interface, and wherein the apparatus is configured to send the charging message for the subscriber as an offline charging message sent over the Ro interface.

3. The apparatus of claim 1, wherein the second information comprises a pointer to a charging address profile containing an Event Charging Function (ECF) associated with online charging, and wherein the apparatus is configured to include in the charging message sent over the Ro interface an indication that the charging type of the subscriber is offline charging.

4. The apparatus of claim 1, wherein the processing circuitry is configured to obtain the subscriber profile in conjunction with the subscriber registering with the IMS network, or in conjunction with a chargeable event in the IMS network involving the subscriber.

5. A method performed by an apparatus configured as a Call Session Control Function (CSCF) in an Internet Protocol Multimedia Subsystem (IMS) network, the method comprising:
determining from first information stored in a subscriber profile associated with a subscriber that the subscriber is of a first charging type;
determining from second information stored in the subscriber profile that charging messages for the subscriber should be sent over a charging interface associated with a second charging type that is different than the first charging type; and
sending a charging message for the subscriber over the charging interface associated with the second charging type, and including in the charging message an indication of the first charging type of the subscriber, thereby enabling the charging system to differentiate the charging type of the subscriber as being different than the second charging type associated with the charging interface over which the charging message is sent;
wherein the first charging type is one of online charging and offline charging, and the second charging type is the other one of online charging and offline charging.

6. The method of claim 5, wherein the first charging type is offline charging, the second charging type is online charging, the charging interface is a Ro interface, and wherein the method includes sending the charging message for the subscriber as an offline charging message sent over the Ro interface.

7. The method of claim 5, wherein the second information comprises a pointer to a charging address profile containing an Event Charging Function (ECF) associated with online charging, and wherein the method further comprises including in the charging message sent over the Ro interface an indication that the charging type of the subscriber is offline charging.

8. The method of claim 5, wherein the method further comprises obtaining the subscriber profile in conjunction with the subscriber registering with the IMS network, or in conjunction with a chargeable event in the IMS network involving the subscriber.

9. An apparatus configured as a charging node in a charging system associated with an Internet Protocol Multimedia Subsystem (IMS) network and comprising:
interface circuitry supporting the exchange of charging messages over a charging interface associated with a second type of charging;
processing circuitry operatively associated with the interface circuitry and configured to:
receive a charging message, as sent over the charging interface by a Call Session Control Function (CSCF) apparatus in the IMS network, for a subscriber involved in a chargeable event in the IMS network;
determine from an indication included in the charging message that the subscriber is of a first charging type different than the second type of charging; and
process the charging message in accordance with the first type of charging, rather than in accordance with the second type of charging;
wherein the first charging type is one of online charging and offline charging, and the second charging type is the other one of online charging and offline charging.

10. The apparatus of claim 9, wherein the second type of charging is online charging, the first type of charging is offline charging, the charging interface is an Ro interface associated with online charging, and wherein the apparatus comprises at least part of an Online Charging System (OCS) that is configured to provide offline charging functionality responsive to receiving charging messages that are indicated as being associated with subscribers whose charging type is offline charging.

11. A method performed by an apparatus configured as a charging node in a charging system associated with an Internet Protocol Multimedia Subsystem (IMS) network, the method comprising:
receiving a charging message, as sent by a Call Session Control Function (CSCF) apparatus in the IMS network, for a subscriber involved in a chargeable event in the IMS network, the charging message being received over a charging interface associated with a second type of charging;

determining from an indication included in the charging message that the subscriber is of a first charging type different than the second type of charging; and processing the charging message in accordance with the first type of charging, rather than in accordance with the second type of charging;

wherein the first charging type is one of online charging and offline charging, and the second charging type is the other one of online charging and offline charging.

12. The apparatus of claim 9, wherein the second type of charging is online charging, the first type of charging is offline charging, the charging interface is an Ro interface associated with online charging, and wherein the method provides offline charging functionality in an Online Charging System (OCS), responsive to receiving charging messages that are indicated as being associated with subscribers whose charging type is offline charging.

\* \* \* \* \*